3,105,183
UNIVERSAL BATTERY CHARGER
John F. Hysler, Sayville, and Raymond H. Legatti, Bellport, N.Y., assignors to Electromagnetic Industries, Inc., Sayville, N.Y., a corporation of New York
Filed Aug. 29, 1962, Ser. No. 220,268
6 Claims. (Cl. 320—39)

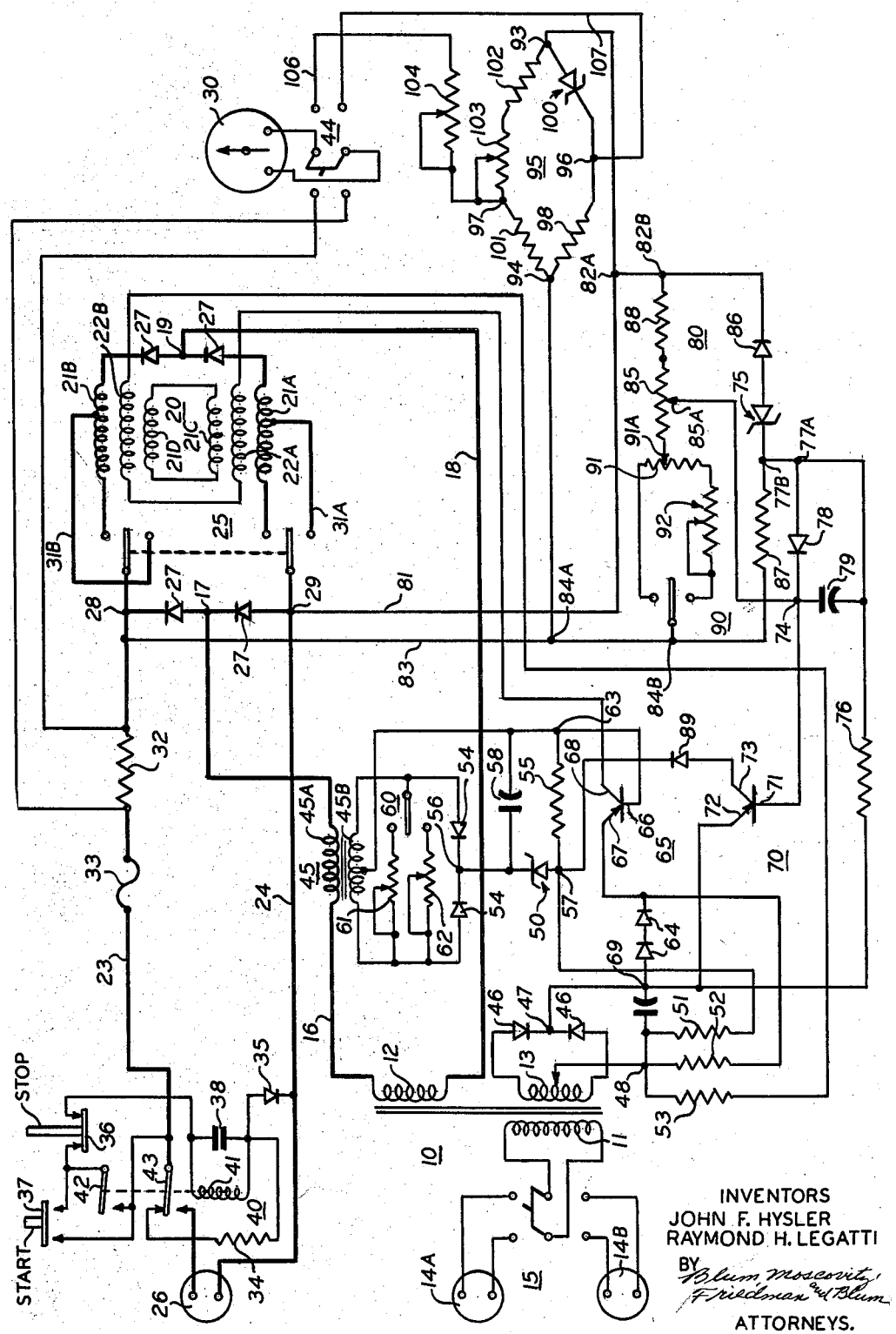

This invention relates to battery chargers and, more particularly, to a novel universal battery charger useable with A.C. potential sources of different frequencies to charge different types of batteries having different charging current rates and different terminal voltages, the battery charger being completely self-protecting against reverse connection of a battery, short circuiting of the charger output terminals, and connection of an absolutely dead battery across its output terminals, and being essentially independent of wide variations in input voltage and in the load connected across its output terminals, as well as being operable over a wide range of ambient temperatures.

Known battery chargers are generally limited to use with a particular type of battery such as, for example, a lead storage battery, and generally can be used only with a power input source of a particular voltage, frequency, or other characteristic. In addition, known battery chargers, in addition to being sensitive to variations in ambient temperature, are subject to damage due to inadvertent short circuiting of their output terminals, or when a dead battery is connected across the output terminals of the charger. A further disadvantage of known battery chargers is that the charging current is largely dependent upon the load across the charger output terminals and, in the case of a relatively dead battery or of one having only a very small charge remaining therein, the load resistance across the output terminals of the charger is very low and consequently the charging current rate is very high. Certain batteries are limited as to the charging current rate which can be handled without damage, and such batteries maybe damaged when used with known battery chargers.

Still another defect of some known battery chargers is that accidental connection of a battery across the charger output terminals with reverse polarity can damage such charger.

There are certain batteries in which the charging current rate cannot exceed a specific limit under any circumstances, and a major defect of known chargers is that they do not limit the charging current rate to a specific maximum value under all circumstances. Known chargers are not capable of charging a battery at a maximum permissable charging rate until such time as the battery voltage comes within the range of the voltage regulating components, and thereafter tapering the charging rate rapidly to zero as the battery voltage approaches its desired terminal value. Thus, for example, most chargers of the type which can be plugged into a power outlet, and which have a current limiting feature, always limit the current to a value determined by the charger voltage and its internal impedance.

Stated another way, known battery chargers of the type which may be plugged into a power outlet are either of the constant current type or the constant voltage type, and thus regulate either the charging current or the voltage but not both.

In accordance with the present invention, a battery charger is provided which maintains the charging current at a pre-selected value until such time as the battery voltage approaches its terminal value. At such time, a voltage-responsive control overrides a current-responsive control and maintains the charging operation at a substantially constant potential while the charging current is rapidly tapered off to zero.

Another novel feature is that the invention charger may be used readily with A.C. input potential sources which may have different frequencies, such as, for example, a 60-cycle source or a 400-cycle source. The control of the charging rate of the battery is by means of a magnetic amplifier and such magnetic amplifiers generally may be used with only one frequency of alternating A.C. potential. However, in accordance with the invention, such a magnetic amplifier is made useable with both a 60-cycle source and a 400-cycle source by using a selector switch providing taps on the power windings of the magnetic amplifier so that the entire length of the power windings may be used with a 60-cycle source and only shorter sections thereof used with a 400-cycle input source.

The combined current and voltage control is effected by means of a transistor preamplifier which is in the nature of a mixer receiving signals from both a current sensing source and a battery voltage sensing source. This preamplifier controls the current flowing through the D.C. control coils of the magnetic amplifier. The latter is of the self-saturating type which is normally so biased as to conduct, and whose conduction can be reduced by the flow of a D.C. current through the control coils to reduce the time during which the magnetic amplifier is conductive and thereby to maintain the charging rate at the selected value.

Still a further feature of the present invention is the provision of a novel combination of a relay and a polarizing or blocking diode which prevents the charging from being effectively electrically connected to a battery when the latter is connected with reverse polarity to the output terminals of the charger, or when the charger output terminals are short circuited.

The means for limiting the charging current to a preselected value also prevents damage to the charger in the event of inadvertent or intentional short circuiting of the charger output terminals. The invention charger may be connected to an absolutely dead battery, and the current limiting arrangement will limit the charging current to a safe value even in this case.

The invention battery charger is useable with a number of different types of secondary batteries such as, for example, the silver-zinc type, the silver-cadmium type, the nickel-cadmium type, and other types of secondary batteries.

For an understanding of the principles of the invention, reference is made to the following description of a typical embodiment thereof as illustrated in the accompanying drawing. In the drawing, the single FIGURE is a schematic wiring diagram of a battery charger embodying the invention.

Referring to the drawing, the A.C. power input to the charger is illustrated, by way of example, as through a main transformer 10 having a primary winding 11 and a pair of secondary windings 12 and 13. The opposite terminals of primary winding 10 are connected to the respective center terminals of a double-pole, double-throw switch 15. One pair of end terminals of switch 15 is connected to a connector 14A, and the other pair of end terminals is connected to a connector 14B. One of the connectors 14A or 14B may be designed for connection to the output of an alternator, and the other connector may be designed for connection to a power outlet, the particular A.C. source being selected by proper positioning of the switch 15. Alternatively, one connector may be designed for connection to a 60-cycle source, for example, and the other for connection to a 400-cycle source, for example.

Transformer secondary winding 12 supplies the charging current for the battery and, for this purpose, one terminal of the secondary winding is connected by a conductor 16 and through the primary winding 45A of a current transformer 45 to a junction point 17, and the other terminal thereof is connected by a conductor 18 to a junction point 19. Control of the flow of charging current to the battery is effected by means of a magnetic amplifier 20 having a pair of power windings or coils 21A and 21B each of which is associated with a control winding or coil 22A or 22B. The power coils 21A and 21B are electrically associated with a double-pole, double-throw frequency selector switch 25 and a full wave rectifier. Magnetic amplifier 20 is provided with a further pair of coils or windings 21C and 21D which are short circuited and have no external connections. These coils act as a time constant or damping winding for the amplifier 20 to slow its response time by a small amount and thus make the response time of amplifier 20 compatible with that of the transistor preamplifier.

The battery charging lines are indicated at 23 and 24 as connected, in a manner to be described, to opposite polarity terminals of a battery connector 26. The full wave rectifier electrically associated with amplifier 20 comprises four diodes 27 which are connected with such polarity that direct current will always flow from junction points 17 or 19 to a junction point 28 connected to the "plus" or positive charging line 23, and will return to junction points 17 or 19 from "minus" or negative charging line 24 through a junction point 29.

The center terminals of frequency selector switch 25 are connected to the respective junction points 28 and 29. The upper end terminals of this switch, as viewed in the drawing, are each connected to an end of a respective power coil or winding 21A or 21B. The lower end terminals of switch 25 are each connected, through a conductor such as 31A or 31B, to a corresponding tap on a winding 21A or 21B, respectively. The opposite terminals of the power coils or windings 21A and 21B are connected through the lower pair of diodes 27 to the junction point 19. When switch 25 is thrown to the right, all of the turns of each of the power coils 21A and 21B are connected in circuit. When switch 25 is thrown to the left, only a smaller number of the turns of each power coil or winding 21A and 21B is thus connected in circuit. The upper position of switch 25 is for 60-cycle operation, and the lower position is for 400-cycle operation. It will be appreciated that it is feasible that the switch 25 be connected to the switch 15 for conjoint operation thereof in the case where connectors 14A and 14B are connectable to A.C. sources of different frequencies.

To complete the tracing through of the current supply to the battery connector, it may be noted that the negative conductor 24 is connected directly between the junction point 29 and battery connector 26. The positive conductor 23 is connected to the battery connector 26 through the medium of a safety relay 40. Included in the positive conductor 23 is a shunt 32 for a combined expanded scale voltmeter and ammeter 30, and a fuse 33. Relay 40 includes an operating coil 41 and a pair of transferrable armatures 42 and 43. Coil 41 has its lower terminal connected through a polarizing or blocking diode 35 to the negative charging conductor 24. The upper terminal of coil 41 is connected through a normally closed "stop" push button 36 and a normally open "start" push button 37 to positive charging line or conductor 23. Thus, if a battery is connected to connector 26 with the right polarity, and "start" button 37 is depressed, the relay coil 41 will be energized to transfer its armatures 42 and 43. If the battery is connected to the connector 26 with reverse polarity, then the blocking diode 35 will prevent any energization of the coil 41 so that the charger remains effectively disconnected from the battery under such circumstances. A transfer of armature 42 closes a shunt circuit around the "start" push button 37 to "hold" relay 41 energized. Transfer of armature 43 connects the charging line 23 directly to the connector 26.

A condenser 38 is connected across the coil 41 to smooth the current flow through the coil by by-passing pulsations. A resistor 34 is connected between the relay armature 43 and the negative line 24 so that, in effect, when relay 41 is not operated, resistor 34 is connected between line 23 and the positive terminal or anode of the diode 35 to serve as a bleeder or dummy load across the output circuit to prevent the voltage of the magnetic amplifier becoming too high when relay 40 is "dropped." When armature 43 is transferred, resistor 34 is cut out of the output circuit.

Meter 30 is connected to the center pair of terminals of a double-pole, double-throw switch 44 which is normally biased to the left as shown in the drawing. In this leftward biased position, the meter 30 is connected across the shunt 32 and serves to indicate the charging current. By pressing switch 44 to the right, the meter 30 may be used to indicate the charging voltage or the voltage of the battery, the righthand terminals of the switch 45 being connected, in a manner to be described, so that a proportion of the voltage across the battery is impressed across these right-hand terminals.

The secondary winding 13 of transformer 10 provides the power supply for the transistor preamplifier circuitry. This secondary winding is center tapped, with its terminals being connected through a full wave rectifier comprising a pair of diodes 46 to a positive junction point 47, and with its center tap being connected to a negative junction point 48. Through resistors 51, 52 and 53 of various values, different potentials are provided for the transistor preamplifier and the control coils 22A and 22B of the magnetic amplifier 20.

The charging current regulating arrangement includes the secondary 45B of the current transformer 45 whose primary 45A is connected in the line 16. This secondary is center tapped and arranged, through a full wave rectifier comprising the diodes 54, to provide a D.C. potential across a zener diode 50 connected between a cathode junction point 56 and an anode junction point 57. Junction point 56 is a junction point of the two diodes 54, and the junction point 57 is connected through a resistor 55 to the center tap of current transformer secondary winding 45. A smoothing condenser 58 is connected across the series connected zener diode 50 and resistor 55. It will be understood that the potential drop across the terminals of the current transformer secondary 45B is a function of the current flow through the conductor 16, and that therefore the potential drop impressed across the series connected zener diode 50 and resistor 55 is proportional to the current flow in conductor 16 and thus to the charging current.

The charging rate is adjustable by means of a single-pole, double-throw switch 60 associated with a pair of adjustable resistances 61 and 62. Corresponding ends of resistors 61 and 62 are connected to one terminal of secondary winding 45B, and the other ends of these resistors are connected to the respective terminals of switch 60. The center terminal of switch 60 is connected to the opposite end of secondary winding 45. The charging current limit rates may be selected by an adjustment of the resistors 61 and 62, and a selection between a pair of thus adjusted charging rates may be made by proper operation of the switch 60 to engage a selected one of its end terminals.

The zener diode 50 maintains the voltage between points 56 and 57 at a constant value, so that any voltage drop across the secondary winding 45B in excess of the voltage drop across the zener diode 50 appears across the resistor 55.

Current transformer 45, zener diode 50, resistor 55, and the associated interconnecting circuitry constitute a charging current sensing means for the preamplifier, as will be described more fully hereinafter.

The conductivity of the magnetic amplifier 20 is controlled by the transistor preamplifier which controls the D.C. current flowing through the coils 22A and 22B. Normally, the magnetic amplifier 20 is biased to be conductive, and its conductivity is reduced in proportion to the value of the D.C. current flowing through the coils 22A and 22B. These coils are connected in series with each other so that the same current flows through both coils, and one terminal of coil 22B is connected through the resistor 53 to the junction point 48.

The transistor preamplifier comprises a first PNP transistor 65 having a base 66, an emitter 67, and a collector 68, and a second transistor PNP 70 having a base 71, an emitter 72, and a collector 73. The base 66 of transistor 65 is connected, at a junction point 63, to the resistor 55. The emitter 67 of transistor 65 is connected, through a pair of series diodes 64, to a junction point 69 connected to the junction point 47. Collector 68 of transistor 65 is connected to the end of control coil or winding 22A. Thus, when transistor 65 is made conductive by application of a suitable bias voltage to its base 66, a D.C. current will flow through the control coils 22A and 22B in series. This will, in turn, reduce the current flow through the power coils 21A and 21B of the magnetic amplifier 20 and thus reduce the charging current. When transistor 65 is non-conductive, the power coils 21A and 21B are fully conductive due to there being substantially no control current flowing through the coils 22A and 22B.

Base 71 of transistor 70 is connected to a junction point 74, and the emitter 72 thereof is connected to the junction point 69. Junction point 69 is connected, through a current limiting resistor 76, to a junction point 77A, and a diode 78 is connected between junction point 77 and junction point 74, there being a noise filtering condenser 79 connected in parallel with diode 78. This diode is a voltage damp or protector diode for the emitter base voltage of transistor 70. Collector 73 of transistor 70 is connected, in series with diode 89, to junction point 57.

The battery voltage sensing signal for the transistor preamplifier is provided by applying the battery potential to a bridge circuit from which a pre-selected portion of the battery voltage is used to provide a voltage sensing signal controlling operation of the preamplifier. For this purpose, a conductor 81 is connected to the negative charging conductor 24 at junction point 29, and has junction points 82A and 82B which are at substantially the negative potential of the battery. Similarly, a conductor 83 is connected to the positive battery charging conductor 23 at the junction point 28, and has junction points 84A and 84B which are thus at the positive potential of the battery. Junction points 82B and 84B constitute the voltage input points for the bridge circuit generally indicated at 80. The output signal from bridge 80 is derived between the junction point 77B and the tap 85A of a potentiometer 85.

One arm of the bridge 80 comprises a zener diode 75 connected, in series with a diode 86, between the junction points 77B and 82B. Diode 86 is a temperature compensating diode for the zener diode 75. The temperature-voltage characteristic of the diode 86 is opposite to the temperature-voltage characteristic of the zener diode 75, and thus there is provided compensation for changes in the voltage drop across the zener diode 75 due to changes in ambient temperature. By this means, the voltage drop across the zener diode 75 is maintained substantially constant irrespective of ambient temperature changes over a relatively wide range.

Another arm of the bridge is constituted by the fixed resistor 87 connected between junction point 77B and junction point 84B. The right end of the potentiometer 85, as viewed in the drawing, is connected to the junction point 82B in series with a resistor 88. Thus, a third arm of the bridge is constituted by the resistor 88 and that portion of the potentiometer 85 to the right of its tap 85A.

A single-pole, double-throw switch 90 has its movable arm connected to the junction point 84B, and a potentiometer 91 and an adjustable resistance 92 are connected in series between the end terminals of the switch 90. The left-hand end of potentiometer 85, as viewed in the drawings, is connected to the tap 91A of the potentiometer 90. Thus, depending upon the position of the switch 80, the fourth arm of the bridge will include that portion of potentiometer 85 to the left of its tap 85A plus either that portion of the potentiometer 91 above its tap 91A or the adjustable resistance 92 in series with that portion of the potentiometer 91 below its tap 91A.

It will be apparent that the switch 90 is selectively operable to connect either potentiometer 91 or adjustable resistance 92 to junction point 84B. Consequently, the potential appearing across the potentiometer 85 will be dependent upon which one of potentiometer 91 or adjustable resistance 92 is connected to junction point 84B, and upon the adjustment of the respective potentiometer or adjustable resistance. As the junction point 74 is connected to the tap 85A of potentiometer 85, a selected potential, with respect to the negative potential of the battery, can be applied to the junction point 74 which is connected to base 71 of transistor 70. As the emitter 72 of transistor 70 is connected to the junction points 77A and 77B, this means that, in effect, the bias applied to the transistor 70 is proportional to the portion of the battery voltage in excess of the null or balance voltage of bridge 80. The importance of this will become apparent as the description proceeds.

Before proceeding to a description of the operation of the charger, the bridge circut for applying a proportion of the battery potential to the expanded scale meter 30 will be briefly described.

This bridge circuit 95 has input junction points 93 and 94. Junction point 93 is connected to negative junction point 82A, and junction point 94 is connected to positive junction point 84A. The output junction points are 96 and 97.

One arm of this bridge is constituted by a zener diode 100 connected between points 93 and 96 and thus maintaining a substantially constant potential between these points. Another arm of the bridge is constituted by a resistor 98 connected between points 96 and 94. A resistor 101 constitutes the third arm of the bridge, and is connected between junction points 94 and 97. The fourth arm of the bridge is constituted by a fixed resistor 102 and an adjustable resistance 103 connected, in series with each other, between points 93 and 97. One end of an adjustable resistance 104 is connected by a conductor 106 to one of the right-hand end terminals of the meter switch 44. A conductor 107 connects junction point 96 to the other right-hand end terminal of the meter switch 44. The proper adjustment of the resistances 103 and 104, a predetermined reduced potential corresponding to the battery potential is impressed across the expanded scale meter 30 whenever the switch 44 is thrown to the right.

The center terminals of the switch 44 are connected to the meter 30, and these center terminals are normally disconnected from the right-hand terminals and are normally spring biased to engage the left-hand terminals. Consequently, by momentarily manually moving the switch 44 to the right, the battery voltage may be read on the expanded scale meter 30, which is suitably calibrated.

The operation of the battery charger will now be described. The battery connector 26 is connected to the battery to be charged, making certain that the polarity connections are correct. The potentiometers 85 and 91 and the adjustable resistance 92 of the bridge 80 are set in accordance with the desired terminal voltage of the battery to be charged, the switch 90 being selectively operated to connect either the potentiometer 91 or the adjustable resistance 92 between junction point 84B and the potentiometer 85. The adjustable resistances 61 and 62 are pre-adjusted for respective charging current limit rates, and switch 60 is operated to one position or the other depending upon the particular charging rate limit to be used for the battery connected to the battery connector 26. One or the other of the connectors 14A or 14B is connected to a source of A.C. potential. Correspondingly, the switch 25 is set in correspondence with the frequency of the A.C. potential source.

To start the charging operation, "start" switch 37 is depressed to energize the relay coil 41 which transfers its contacts 42 and 43. The contacts 42 close the shunt around the switch 37, so that this switch may now be released. The contacts 43 connect the line 23 directly to the "plus" terminal of the connector 26, so that the charging operation starts, and also cut out resistance 34.

It will be noted that, when transistor 70 is conductive, its collector 73, which is connected to the junction point 57 through the diode 89, ties this junction point to the junction point 69 and normally would thereby substantially decrease the base bias of the transistor 65. Transistor 70 has an operating bias applied thereto so long as the battery voltage is less than the pre-set desired terminal voltage, so that normally this transistor 70 is conductive thus to make the transistor 65 less conductive by decreasing its base bias.

However, the transistor 65 is responsive or sensitive to the charging current. Whenever this transistor 65 is non-conductive, no D.C. current flows through the control coils 22A and 22B so that the power coils 21A and 21B of the magnetic amplifier 20 allow the full current to flow to the battery. This current is "measured" by the current transformer so that it provides a voltage drop across the terminals of secondary winding 45B, and a proportion of this voltage appears across the resistor 55, if the voltage drop is in excess of the drop across zener diode 50. The constants are so selected that, when the charging current rate exceeds the pre-set limiting rate, the potential appearing at the junction point 57 is such that the transistor 65 is rendered conductive irrespective of the condition of the transistor 70. Consequently, a D.C. current flows through the transistor 65 and, in series, through the control coils 22A and 22B in accordance with the difference between the pre-set charging current limit and the actual charging current. This controls the conductivity of power coils 21A and 21B so that the charging current is reduced to the pre-set limiting rate.

This operation continues until such time as the battery voltage approaches its terminal value. At this time, the charging current will have been gradually reduced to a relatively low value due to the increasing potential of the battery, acting as a back electromotive force. When the charging current has decreased to a value such that the voltage drop appearing between the junction points 56 and 63 is equal to or less than the substantially constant voltage drop across the zener diode 50, there will be no "excess" voltage appearing across the resistor 55. Consequently, the forward bias of the transistor 65 will be removed and the latter will remain non-conductive. Thus, the control effect of the transistor 70 on the conductivity of the transistor 65 is able to "override" the control effect of the charging current on the conductivity of the transistor 65.

When the charging current has decreased to a value such that the forward bias is removed from the transistor 65, the transistor 70 remains conductive because its forward base bias is a function of the difference between the actual voltage of the battery and the voltage value preset by adjustment of the bridge 80. This difference is such as to forward bias the transistor 70 to the conducting state. Consequently, transistor 70 ties the base 66 of transistor 65, through the resistor 55, back to the junction point 69 and thus, in effect, reverse biases the emitter-base junction of transistor 65.

The charging continues at a decreasing rate until such time as the terminal voltage of the battery substantially equals the desired pre-set terminal voltage, at which time the forward bias on the transistor 70 is reduced to such a value that the latter becomes non-conductive. At this time, the charging current will have been reduced to substantially a zero value due to the increasing potential of the battery being charged so that the potential difference effective to provide for charging current flow is reduced substantially to zero. The battery is now fully charged and the charger becomes substantially inactive.

Under normal operation, the "stop" push button 36 is now operated to drop the relay 40 and to move its contacts 42 and 43 back to the position shown in the drawing.

Should the battery charger be connected to an absolutely dead battery, the current flow is still limited to a safe value by virtue of the charging rate control provided by the current limiting system including transistor 65. Also, should the output terminals of the charger be short circuited, the same will hold true and the current will again be limited by virtue of the current limiting control.

The relay 40 avoids the possibility of damage to the charger due to connecting a battery to the charger with reverse polarity. In such case, the diode 35 will prevent an effective potential being applied across the coil 41 of the relay 40 so that the relay armatures cannot be transferred by operation of the push button 37.

The described charger is essentially independent of the value of the input voltage or the value of the load connected thereto. This is due to the dual regulation system involving the charging current sensing control and the battery voltage sensing control. By virtue of this dual system, the charger will regulate or limit the charging current irrespective of the input voltage or of variations in the output load. The input voltage can range, in a particular example, through plus or minus fifteen percent, and by proper design, the input voltage range could be plus or minus fifty percent.

Furthermore, the charger is fully effective and efficient over a wide temperature range of minus 40° C. to plus 50° C. This is due to the forward temperature characteristic of the diode 86 being opposed to the forward temperature characteristic of the zener diode 75.

While a specific embodiment of the invention has been shown and described in detail to illustrate the application of the principles of the invention, it will be understood that the invention may be embodied otherwise without departing from these principles.

What is claimed is:

1. A battery charger comprising, in combination, an input circuit adapted for connection to A.C. potential sources of different frequencies; a polarized battery connector; a magnetic amplifier having power coils connected, in series with rectifying means, in a charging current circuit connecting said input circuit to said battery connector for flow of charging current to said battery connector; switching means selectively operable, when said input circuit is connected to a relatively low frequency A.C. source, to connect the full lengths of said power coils into said charging circuit and, when said input circuit is connected to an A.C. source of higher frequency, to connect a lesser number of turns of said power coils into said charging circuit, the number of turns of said power coils connected into said charging circuit being inversely proportional to the frequency of the connected A.C. source; said magnetic amplifier having D.C. control coils; a source of direct current; charging current-responsive means connected between said D.C. source and said control coils and effective to modulate the flow of direct current through said control coils in accordance with the charging current to maintain the charging current within a preselected limiting value; battery voltage-responsive means operable to override said charging current responsive means as the battery voltage approaches a preselected terminal value to regulate the flow of charging current to said battery connector in accordance with the battery voltage.

2. A battery charger comprising, in combination, a potential transformer having a primary winding and secondary winding means; means operable to connect said primary winding to a source of A.C. potential; a magnetic amplifier having power coils and control coils; a polarized battery connector; circuit means, including rectifier means, connecting said power coils in a charging circuit connecting said secondary winding means to said battery connector for flow of D.C. charging current to said battery connector; a D.C. power supply energized from said transformer; a transistor operable to control the flow of D.C. current from said D.C. power supply to said control coils; a current transformer connected in the charging current circuit; means connected to the secondary winding of said current transformer and operable to derive, from the potential across said secondary winding, a control potential proportional to the charging current; charging current selector means operable to adjust said control potential to a value corresponding to a preselected limiting charging current rate; means operable to apply the portion of the control potential in excess of a substantially constant potential to said transistor to control the bias of the latter in accordance with the differential between the actual charging current rate and the pre-set limiting rate; battery terminal voltage preselecting means; voltage-responsive control means operatively connected to said preselecting means, said transistor and said D.C. power source and effective, when the charging current is reduced, due to the battery voltage approaching the pre-set terminal value, to a value such that said control potential is less than said substantially constant potential, to control the bias of said transistor in accordance with the battery voltage; said control potential deriving means including a full wave rectifier connected across said current transformer secondary winding; a zener diode and a resistor connected in series between opposite terminals of said rectifier, whereby any potential between said opposite terminals and in excess of the voltage rating of said zener diode will appear across said resistor constituting said transistor biasing means; said charging current selecting means including means selectively operable to pre-set the voltage drop applied from said current transformer secondary winding to said full wave rectifier; said magnetic amplifier power coils being normally biased to conductivity and having their conductivity modulated inversely in accordance with the flow of direct current through said control coils; said voltage-responsive control means being operable to normally render said transistor nonconductive, and being overridden by the potential across said resistor as applied to the base of said transistor when the charging current exceeds such preselected limiting value.

3. A battery charger, as claimed in claim 2, in which said voltage-responsive control means comprises a second transistor operable, when conductive, to tie together the emitter and base of said first mentioned transistor, said second transistor having its forward bias controlled in accordance with the difference between said preselected battery terminal voltage and the voltage of a battery connected to said battery connector.

4. A battery charger, as claimed in claim 3, including a pair of conductors connected to opposite terminals of said battery connector; a comparison bridge, including a source of substantially constant reference potential, having its input junctions connected between said conductors; and adjustment means included in said bridge to adjust the preselected battery terminal voltage effective upon said second transistor.

5. A battery charger, as claimed in claim 4, including a pair of input connectors respectively adapted for connection to A.C. potential sources of different frequencies; first switch means selectively operable to connect the primary winding of said transformer to either of said connectors; and second switch means selectively operable to connect the entire lengths of said power coils into said charging circuit, upon connection of said primary winding to the lower frequency source, and to connect a reduced number of turns of said power coils into said charging circuit upon connection of said primary winding to the higher frequency source.

6. A battery charger, as claimed in claim 2, in which the means for adjusting the potential applied across said rectifier comprises a pair of adjustable resistances connected to one end to one terminal of said current transformer secondary winding; and a single-pole, double-throw switch having its center terminal connected to the other terminal of said current transformer secondary winding and selectively connectable to either of a pair of end terminals each respectively connected to one of said adjustable resistances; said single-pole, double-throw switch constituting said limiting charging current selecting means.

References Cited in the file of this patent
UNITED STATES PATENTS 2,914,720  Merkel _____ Nov. 24, 1959
3,054,040  Moyer _____ Sept. 11, 1962
3,062,998  Medlar _____ Nov. 6, 1962

OTHER REFERENCES

"Basic Theory and Application of Transistors," Army Technical Manual TM 11–690, March 1959 (page 99 relied on).